(12) United States Patent
Baek et al.

(10) Patent No.: US 10,988,265 B2
(45) Date of Patent: Apr. 27, 2021

(54) APPARATUS FOR PROTECTING ENGINE OF AIRCRAFT

(71) Applicants: Yoon-ki Baek, Gyeonggi-do (KP); Yu-dam Baek, Gyeonggi-do (KP)

(72) Inventors: Yoon-ki Baek, Gyeonggi-do (KP); Yu-dam Baek, Gyeonggi-do (KP)

(*) Notice: Subject to any disclaimer, the term of this patent is extended or adjusted under 35 U.S.C. 154(b) by 75 days.

(21) Appl. No.: 16/513,743

(22) Filed: Jul. 17, 2019

(65) Prior Publication Data
US 2020/0398995 A1    Dec. 24, 2020

(51) Int. Cl.
*F02C 7/055* (2006.01)
*B64D 33/02* (2006.01)

(52) U.S. Cl.
CPC .............. *B64D 33/02* (2013.01); *F02C 7/055* (2013.01); *B64D 2033/022* (2013.01)

(58) Field of Classification Search
None
See application file for complete search history.

(56) References Cited

U.S. PATENT DOCUMENTS

| 2011/0011055 | A1  | 1/2011  | Troy |              |
|--------------|-----|---------|--------|-------------|
| 2013/0000271 | A1* | 1/2013  | Sonei  | F02C 7/055  |
|              |     |         |        | 60/39.092   |
| 2017/0292448 | A1* | 10/2017 | Dornier | F02C 7/055 |

FOREIGN PATENT DOCUMENTS

| KR | 100180765    | 5/1995 |
| KR | 1020140049996 | 4/2014 |

OTHER PUBLICATIONS

Notification of Refusal for KR10-2019-0074176; dated Jun. 26, 2020.

* cited by examiner

*Primary Examiner* — Todd E Manahan
*Assistant Examiner* — Alyson Joan Harrington
(74) *Attorney, Agent, or Firm* — Patshegen IP LLC; Moshe Pinchas

(57) ABSTRACT

Disclosed is an apparatus for protecting an engine of an aircraft to prevent an inlet of an engine of an aircraft from being damaged. The apparatus includes: a protective net attached to an inlet arranged at a front of the engine of the aircraft; and hangers configured to fix the protective net along a side surface of the engine, wherein the protective net includes a plurality of circular fibers concentrically arranged while forming a circle, and a fixing fiber configured to fix an outer peripheral surface of the circular fibers to an outer surface of the engine while being bound to inner surfaces of the circular fibers and passing through a center of the circular fibers.

3 Claims, 5 Drawing Sheets

US 10,988,265 B2

APPARATUS FOR PROTECTING ENGINE OF AIRCRAFT

BACKGROUND OF THE INVENTION

1. Field of the Invention

The present invention relates to an apparatus for protecting an engine of an aircraft, and more particularly, to an apparatus for protecting an engine of an aircraft to prevent an inlet or engine of a military or general aircraft from being damaged.

2. Description of the Related Art

As the tourism industry develops, the number of flights has been increasing globally and exponentially, and the number of passengers using aircrafts has been increasing continuously. However, when a bird collides with an inlet of an engine arranged against the direction from which wind blows during flight of the aircraft, wrecks of the bird may be absorbed into the inside of the engine, thereby causing a malfunction of the engine.

Because birds fly in groups, a lot of damage may occur in the engine of the airplane when more than one bird collide, and accumulation of the above impact may lead to a major accident due to failure of the engine. Actually, it is known that the air accident, called the miracle of the Hudson River, occurred due to the loss of propulsive force of two engines after a flock of birds collides with an engine portion of an aircraft.

Accordingly, it is necessary to provide a mechanism for preventing a foreign material from being introduced into an inside of an engine that generates the propulsive force during flight of the aircraft so as to protect the engine. Korean Patent Application No. 10-2000-0007418 discloses a method of coupling a protective cover like a fan cover to a front of an engine of an aircraft. However, it is difficult for the protective cover to withstand the impact caused by collision of birds. Thus, it is necessary to provide a protective device that is easy to install and stable and that effectively reduces the impact of birds.

SUMMARY OF THE INVENTION

The present invention relates to an apparatus for preventing a bird from colliding with a front of an engine of an aircraft by using an aramid fiber, a super fiber or the like, and more particularly, to an apparatus that can be additionally installed without changing an engine structure of an aircraft.

The apparatus for protecting the engine of the aircraft according to the embodiments of the present invention includes a protective net attached to an inlet arranged at a front of the engine of the aircraft, and hangers for fixing the protective net along a side surface of the engine, wherein the protective net includes a plurality of circular fibers concentrically arranged while forming a circle, and a fixing fiber for fixing an outer peripheral surface of the circular fiber to an outer surface of the engine while being fastened to an inner surface of the circular fiber to pass through a center of the circular fibers, in which the circular fiber and the fixing fiber are formed of an aramid fiber, the fixing fiber is formed by manufacturing the aramid fiber into one strand of a predetermined thickness, folding the strand in half to form two strands, and twisting one side the two strands, and both ends of the fixing fibers are fastened to the hangers spaced apart from each other at a predetermined distance along the side surface of the engine.

According to an embodiment of the present invention, when the aircraft flies in a state where a front portion of the engine is fastened with a protective net composed of the aramid fiber or super fiber formed of high-elasticity and high-strength materials, an external object such as a bird is crushed into a small size before entering the engine, so that components inside the engine can be protected.

DETAILED DESCRIPTION OF THE INVENTION

Figure 1:
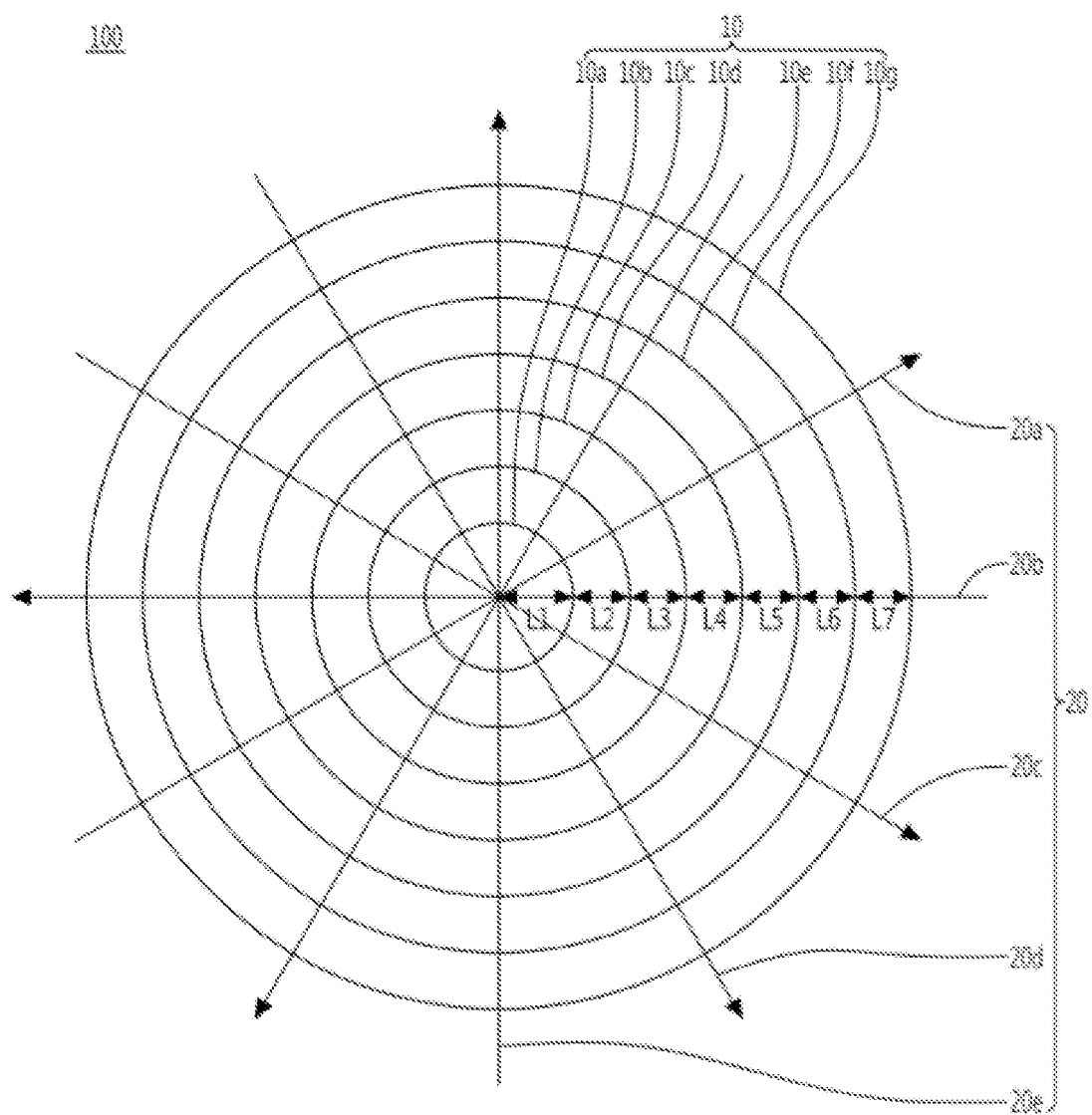
FIG. 1 is a front view of an apparatus for protecting an engine of an aircraft according to an embodiment of the present invention.
Figure 2:
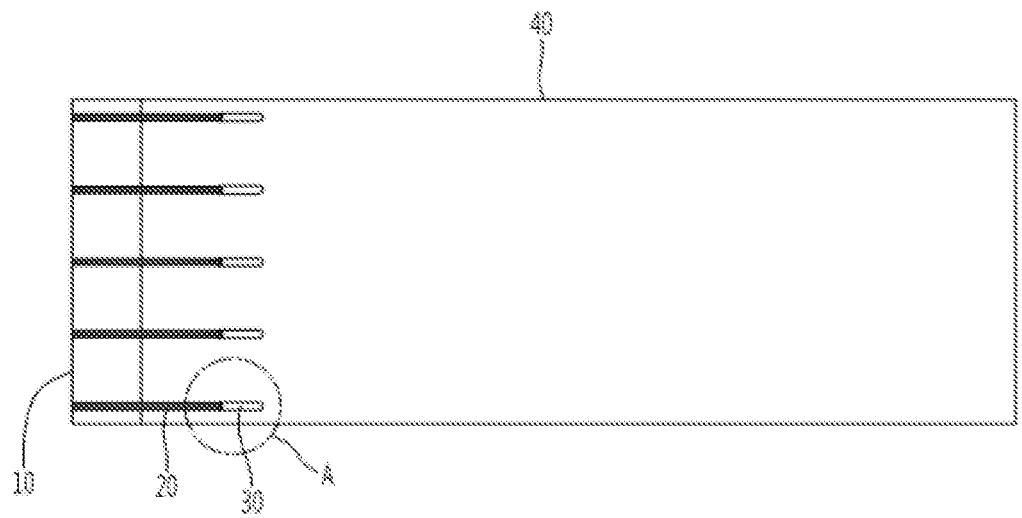
FIG. 2 is a side view of an apparatus for protecting an engine of an aircraft, which is mounted to the engine view from the side according to an embodiment of the present invention.

FIG. 1 is a front view of an apparatus for protecting an engine of an aircraft according to an embodiment of the present invention. FIG. 2 is a side view of the apparatus for protecting the engine of the aircraft, which is mounted to the engine view from the side according to an embodiment of the present invention.

Referring to FIGS. 1 and 2, the apparatus for protecting the engine of the aircraft according to an embodiment includes a protective net 100 attached to an inlet formed at a front of the engine 40, and hangers 30 for fixing the protective net 100 along a side surface of the engine 40.

The protective net 100 may be configured in the form of a spider web as shown in the drawing. In other words, the protective net 100 may include a plurality of circular fibers 10 arranged in a concentric shape, and a fixing fiber 20 for fixing an outer peripheral surface of the circular fiber to an outer surface of the engine 40 while being bound to an inner surface of the circular fiber 10 to pass through a center of the circular fiber 10.

An overall shape of the protective net 100 may be circular to correspond to a shape of the inlet of the engine 40, and an inside of the protective net may have a spider web-like shape in which a plurality of circular fibers 10 are arranged to be sequentially concentric.

The circular fiber 10 may include a first circular fiber 10a at an innermost position, a second circular fiber 10b having a greater diameter than that of the first circular fiber 10a, a third circular fiber 10c having a greater diameter than that of the second circular fiber 10b, a fourth circular fiber 10d having a greater diameter than that of the third circular fiber 10c, a fifth circular fiber 10e having a greater diameter than that of the fourth circular fiber 10d, a sixth circular fiber 10f having a greater diameter than that of the fifth circular fiber 10e, and a seventh circular fiber 10g having a greater diameter than that of the sixth circular fiber 10f.

Although the number of the circular fiber is seven in the embodiment for convenience of description, the number of the circular fiber may be appropriately changed according to a size of the engine.

After the first circular fiber 10a to the seventh circular fiber 10g are spaced apart from each other by a predetermined distance as described in the above manner, the fixing fiber 20 is disposed to fix positions between the circular fibers.

A plurality of fixing fibers 20 may be provided to form a predetermined angle while passing a center of the circular fibers 10. The fixing fiber 20 may include a first fixing fiber 20a passing through the center of the circular fibers 10, a second fixing fiber 20b spaced apart from the first fixing fiber 20a at the center of the circular fiber 10 by 30 degrees, a third fixing fiber 20c spaced apart from the second fixing fiber 20b at the center of the circular fiber 10 by 30 degrees, a fourth fixing fiber 20d spaced apart from the third fixing fiber 20c at the center of the circular fiber 10 by 30 degrees, a fifth fixing fiber 20e spaced apart from the fourth fixing fiber 20d at the center of the circular fiber 10 by 30 degrees, and a sixth fixing fiber 20f spaced apart from the fifth fixing fiber 20e at the center of the circular fiber 10 by 30 degrees.

Like the circular fibers 10, the fixing fiber in the embodiment is configured to include the six fixing fibers at an angle of 30 degrees with respect to each other for convenience of description, but the number of fixing fibers may be appropriately changed according to the size of the engine. However, it is preferable that the angles formed by the fixing fibers are set to be the same. For example, when the number of the fixing fibers is five, each of the fixing fibers may be arranged at an angle of 36 degrees with respect to each other.

The present invention is provided to prevent a bird from being sucked into the inlet of the engine of the aircraft in flight and causing a damage to an inside of the engine. To this end, it is necessary to select a material for the circular fiber 10 and the fixing fiber 20.

The circular fiber 10 and the fixing fiber 20 constituting the protective net 100 may be formed of an aramid fiber. The aramid fiber refers to a material forming a polymer polyamide by bonding amide bonded —CONH to an aromatic ring such as a benzene ring, and the aramid fiber has excellent tensile strength, toughness and heat resistance and has high strength and high elastic modulus, in which aramid fibers having a thickness of 5 mm are known to support a weight of 2 tons.

Assuming that a bird weighing approximately 4 kg to 5 kg is flying, and an aircraft is flying at a speed of 450 km to 500 km per hour, it may be estimated that a total impact when the bird collides with the inlet of the engine of the airplane is approximately 2 tons to 2.5 tons. A super fiber having similar or higher strength than the aramid fiber may also be used.

Accordingly, the circular fiber 10 and the fixing fiber may be manufactured by using one strand having a predetermined thickness obtained by twisting the aramid fiber to withstand the above impact. Preferably, when the thickness of the circular fiber 10 and the fixing fiber 20 is 1.5 mm, one strand may withstand an impact of 500 kg, so that the circular fibers 20 having a plurality of concentric circles can receive the entire impact in a dispersed state, and the fixing fiber 20 and the circular fiber 10 can sustain the binding without disconnection.

In addition, when the bird collides with the protective net 100 including the circular fiber 10 and the fixing fiber 20, the colliding bird may be crushed by the inner density of the protective net 100, in other words, by a gap between the circular fibers 10, and then introduced into the inside of the engine. Accordingly, the inner density of the protective net 100 is required to be set to minimize the impact of fragments of the crushed bird on internal components of the engine.

As shown in FIG. 1, the first circular fiber 10a to the seventh circular fiber 10g are spaced apart from each other by a predetermined distance L2 to L7. When an average size of the bird and an impact on the engine are considered as described above, it is preferable that the first circular fiber 10a to the seventh circular fiber 10g are spaced apart from each other by a gap of 7 cm between neighboring circular fibers.

More preferably, the first circular fiber 10a disposed at an innermost position inside the protective net may have a diameter of 7 cm, and gaps between adjacent circular fibers may be gradually decreased by 2 mm in the outward direction.

As shown in FIG. 2, the protective net 100 shown in FIG. 1 may be disposed to cover an inlet surface of the engine 40 located in the moving direction of the aircraft.

In addition, the hangers 30 are disposed at a distance corresponding to the angle formed by the fixing fiber around the center of the engine along the side surface of the engine.

One fixing fiber 20 may extend from the center of the protective net to both ends of the fixing fiber 20, and the both ends of the fixing fiber 20 may be fastened and fixed to the hangers 30, respectively. Accordingly, two hanger 30 may be disposed for each of the fixing fibers 20 so as to be fastened by the both ends of the fixing fiber.

Figure 3:
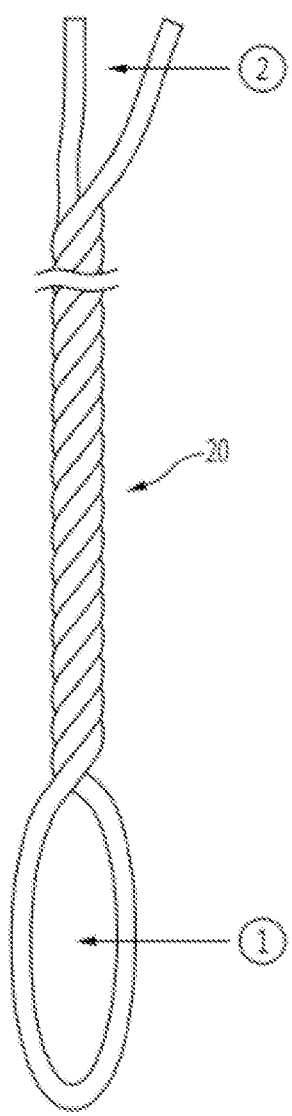
FIG. 3 is a view showing a fixing fiber in an apparatus for protecting an engine of an aircraft according to an embodiment of the present invention.

FIG. 3 is a view showing the fixing fiber in the apparatus for protecting the engine of the aircraft according to an embodiment of the present invention. In the embodiment, the fixing fiber 20 may be formed by manufacturing the aramid fiber into one strand of a predetermined thickness, folding the one strand in half, and twisting one side of the folded strand. Accordingly, one end of the fixing fiber 20 is in the form of a continuous strand and the other end has a disconnected shape (an open state). A ring is formed at the continuous strand and the ring may be hooked by and fixed to the hanger to be described later. In addition, the disconnected portion of the strand is also fixed to the hanger, wherein a process to wind and tie the strand on the hanger is required.

In other words, the both ends of the fixing fiber 20 are portions hooked by and fixed to the hangers provided on the side surface of the engine, and a portion which is twisted with two strands is an area coming into contact with the circular fiber 10. As for the combining scheme between the circular fiber 10 and the fixing fiber 20, in order to fasten the circular fiber 10 to the fixing fiber 20, the circular fiber 10 may be rotated by at least one turn around a plurality of fixing fibers 20 arranged at a predetermined angle.

In addition, the circular fiber 10 may be fastened and fixed onto the fixing fibers such that the circular fiber 10 forms a circle by inserting the circular fiber 10 into the twisted portion of the fixing fiber 20.

Figure 4A:
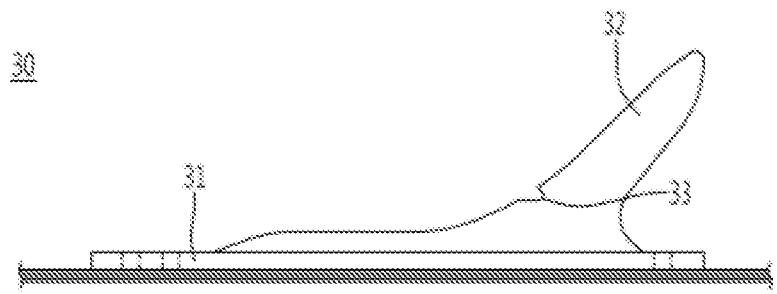
FIGS. 4(a) and 4(b) are a sectional view showing a portion A of FIG. 2 of an apparatus for protecting an engine of an aircraft viewed from the side, and a plan view viewed from the top, respectively, according to an embodiment of the present invention.
Figure 4B:
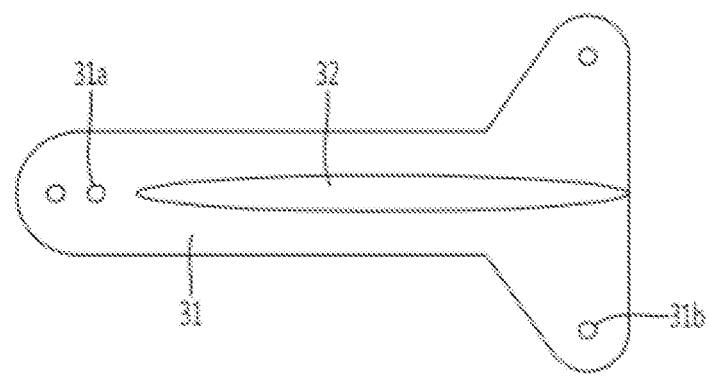

FIGS. 4(a) and 4(b) are a sectional view showing a portion A of FIG. 2 of the apparatus for protecting the engine of the aircraft viewed from the side, and a plan view viewed from the top, respectively, according to an embodiment of the present invention. FIG. 4(a) shows a side view of one among the hangers 30 attached to the surface of the engine.

The hanger 30 is configured to be attached to the surface of the engine and comes into contact with wind during flight of the aircraft. Accordingly, the hanger 30 is required to be formed in a structure that receives relatively less resistance aerodynamically, and it is preferable to have a structure that can be easily installed on the side surface of the engine while withstanding the impact on the protective net caused by the collision of an organism such as a bird.

In the embodiment, the hanger 30 may include a body 32 protruding in a direction perpendicular to the side surface of the engine, and a coupling plate 31 coupled to the side surface of the engine to fix the body 32.

The body 32 may have a streamlined curve, such as a tail wing of the aircraft, gradually ascending toward a rear of the engine and pulled back forward from a highest point of the body by a predetermined depth.

The body 32 may have a fastening portion 33 formed at a preset height of a protruding portion in the body and recessed by a predetermined depth so as to be fastened by the fixing fiber. The fixing fiber is fixed while being hooked by the fastening portion 33 of the body 32.

The rear side of the body 32 has an area pulled back forward, so that the fixing fiber can be prevented from moving upward, thereby preventing the fixing fiber from being separated from the body 32.

The coupling plate 31 is configured to have a coupling surface for enable the body 32 to be coupled to the surface of the engine, in which the coupling plate 31 may include a first coupling portion 31a formed at a front of the coupling plate 31 (directed to the inlet of the engine) and screwed to the surface of the engine, and a second coupling portion 31b formed at a rear of the coupling plate 31 and screwed to the surface of the engine. Because the second coupling portion 31b is an area where a part of the body 32 protrudes to hook and fix the fixing fiber and receives a relatively large amount of force, at least two second coupling portions 31b may be formed at positions perpendicular to the extending direction of the body 32.

Figure 5:
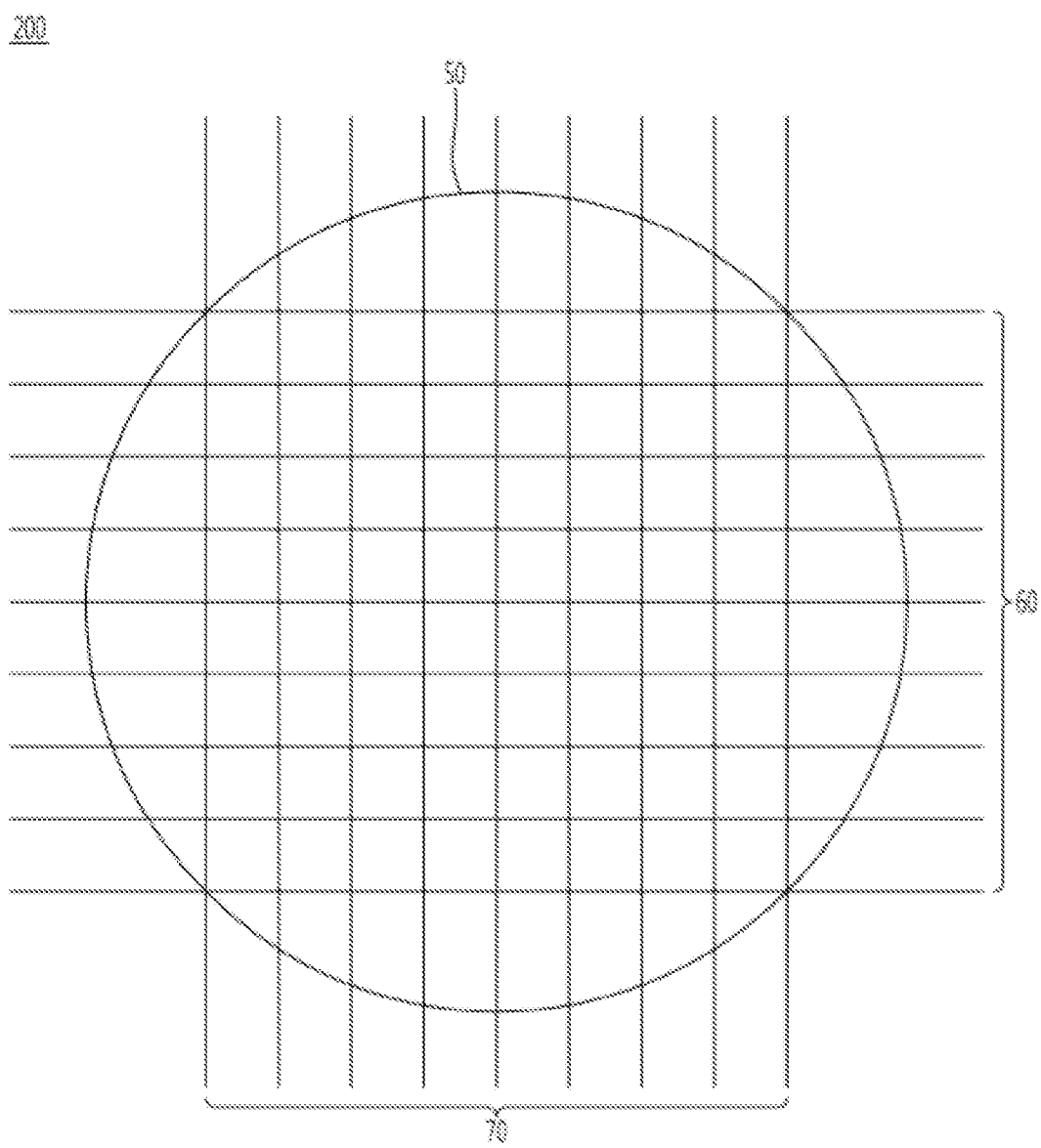
FIG. 5 is a front view of an apparatus for protecting an engine of an aircraft according to another embodiment of the present invention.

FIG. 5 is a front view of the apparatus for protecting the engine of the aircraft according to another embodiment of the present invention.

Referring to FIG. 5, the apparatus 200 for protecting the engine of the aircraft according to another embodiment may include a circular fiber 50 configured to correspond to a diameter of the inlet of the aircraft, a plurality of horizontal fixing fibers 60 arranged in the horizontal direction of the circular fiber 50, and a plurality of vertical fixing fibers 70 arranged in the vertical direction of the circular fiber 50.

In another embodiment of the present invention, fixing fibers intersecting each other in the horizontal and vertical directions within the circular fiber 50 may form a lattice structure. In other words, the horizontal fixing fibers 60 and the vertical fixing fibers 70 are engaged to each other inside the circular fiber 50, so that the organism such as the bird, during flight of the aircraft, may collide with the lattice portions formed by the fixing fibers, be crushed to into a size of the lattice, and move to the inside of the engine.

Like the embodiment shown in FIG. 1, both ends of the horizontal fixing fiber 60 and the vertical fixing fiber 70 may protrude to the outside of the circular fiber 50 by a certain distance, and the both ends may be fastened and fixed to the hangers as shown in FIG. 4.

What is claimed is:

1. An apparatus for protecting and engine of an aircraft, the apparatus comprising:
   a protective net attached to an inlet arranged at a front of the engine of the aircraft; and
   a plurality of hangers configured to fix the protective net along a side surface of the engine, wherein the plurality of hangers are spaced apart from each other at a predetermined distance along the side surface of the engine,
   wherein each of the plurality of hangers includes a body protruding in a direction perpendicular to the side surface of the engine, the body including a fastening portion formed at a preset height of the body and recessed by a predetermined depth;
   the protective net includes a plurality of circular fibers concentrically arranged while forming a circle, and a plurality of fixing fibers configured to fix an outer peripheral surface of the plurality of circular fibers to an outer surface of the engine, each of the plurality of fixing fibers being bound to each of the plurality of circular fibers and passing through a center of the plurality of circular fibers, and wherein
   the plurality of circular fibers and the plurality of fixing fibers being formed of an aramid fiber material,
   each of the fixing fibers is formed by manufacturing the aramid fiber material into one strand of a predetermined thickness, folding the one strand in half to form a folded strand including two strand halves, and then twisting the two strand halves together to form a ring-shaped loop at a first end and leaving an end portion of each of the two strand halves disconnected at a second end; and
   wherein each of the plurality of fixing fibers fixes the protective net to a corresponding pair of the plurality of hangers by fixing the ring-shaped loop at the first end to the fastening portion of a first one of the corresponding pair, and fixedly tying the end portion of each of the two strand halves at the second end to the fastening portion of a second one of the corresponding pair.

2. The apparatus of claim 1, wherein an innermost circular fiber in the protective net has a diameter of 7 cm.

3. The apparatus of claim 1, wherein each of the plurality of hangers includes a coupling plate attached to the body and coupled to the side surface of the engine.

* * * * *